United States Patent Office 3,659,003
Patented Apr. 25, 1972

3,659,003
THERMOSET MOLDING POWDERS FROM HYDROXY-FUNCTIONAL GRADED ELASTOMER PARTICLES AND MONOBLOCKED DIISOCYANATE AND MOLDED ARTICLE
Olin B. Johnson, Livonia, and Santokh S. Labana, Dearborn Heights, Mich., assignors to Ford Motor Company, Dearborn, Mich.
No Drawing. Filed Dec. 21, 1970, Ser. No. 100,469
Int. Cl. C08g 41/04
U.S. Cl. 260—859   29 Claims

ABSTRACT OF THE DISCLOSURE

Novel thermosetting resin powders which can be molded to form unique, urethane-crosslinked, elastomer-comprising products are prepared by reacting hydroxy-functional, graded, acrylic, rubber-like particles with a monoblocked diisocyanate. These powders are molded by conventional molding techniques to form unique thermoset products.

THE INVENTION

Self-crosslinking, dry, thermosettable molding powders suitable for rapid curing during processing by conventional molding techniques are prepared by reacting a hydroxy-functional, graded, elastomeric, crosslinked, acrylic polymer comprising particle with a monoblocked diisocyanate. The molded products provide a flexible thermoset having good resistance to abrasion and organic solvents. Among the many uses for which these products have utility are cover sleeves for flexible cables and conduits, specialized flooring materials, flexible housings, etc.

(I) Preparation of the hydroxy-functional, graded rubber particles

The graded rubber particles has a core of crosslinked, elastomeric, acrylic polymer, an outer shell comprising methyl methacrylate and a hydroxy-functional acrylate and an intermediate layer which is a copolymer of the monomers used to form the core and the monomers used to form the outer shell.

The process for preparing these materials is at least a two-stage process. In one method of preparation, a major amount of monofunctional monoacrylate is emulsion copolymerized in the first stage with a crosslinking amount of a di- or tri- functional monomer containing two more non-conjugated terminal ethylenic groups, preferably a diacrylate, using a water-soluble free radical initiator and a suitable surfactant to yield a latex of relatively uniform particle size, e.g., 0.04 to 1 micron average diameter. Before this reaction reaches substantial completion, i.e., when the reaction is between about 50 and about 90, preferably between about 70 and about 89, percent complete, the second monomeric component, i.e., a mixture of about 65 to about 99, preferably about 70 to about 95, mole percent methyl methacrylate, and about 1 to about 35, preferably about 5 to about 30 mole percent of a hydroxyalkyl acrylate or a mixture of about 1 to about 35, preferably about 5 to about 30 mole percent hydroxyalkyl acrylate and about 65 to about 99 mole percent of a monomer mixture selected from and consisting essentially of esters of acrylic or methacrylic acid and a $C_1$–$C_8$ monohydric alcohol, monovinyl hydrocarbons, diacrylates and divinyl hydrocarbons, is added slowly to the reaction mixture. The polymerization process is continued to yield a stable latex of relatively uniform particle size and composition. A surfactant is used in forming the emulsion and additional surfactant may be added simultaneously with the second stage monomeric component.

The latex is coagulated, washed and dried to yield a finely divided white powder suitable for use in this invention. Generally, the particles are prepared from monomers that will provide a crosslinked acrylic, rubber-like core and a glass-like polymeric outer shell at room temperature, e.g., 20° to 30° C. The terms "rubberlike" and "glass-like" are, of course, meaningless except when used in reference to a specific temperature or temperature range. The particles should be formualted so that the core retains its rubber-like properties and the outer shell retains its glass-like properties at temperatures encountered by articles of commerce in the intended field of use. Hence, for practical purposes, the monomers should be selected so that the core has a glass transition temperature that is substantially below that of the outer shell. Advantageously, the difference in glass transition temperature between the core and the shell is at least 50° C., preferably above 100° C.

The core is formed from a major amount of an alkyl, monofunctional, monoacrylate and a crosslinking amount of a di- or tri- functional monomer containing 2 or more non-conjugated terminal ethylenic groups. The monofunctional, alkyl, monoacrylate is preferably an ester of a $C_2$–$C_8$ monohydric alcohol and acrylic acid, e.g., ethyl acrylate, butyl acrylate, hexyl acrylate, 2-ethyl hexyl acrylate and/or mixtures of the same. Certain other alkyl acrylates may be used when the crosslinked polymer thereof has an appropriate glass transition temperature, e.g. dodecyl methacrylate. Butyl acrylate and 2-ethyl hexyl acrylate are the most preferred of the monoacrylates for use in forming the core. The polymers produced from most methacrylates have glass transition temperatures which are too high to provide rubber-like properties at normally encountered temperatures. Hence, except for special use applications, the monoacrylate component of the core will be either an ester (or esters) of acrylic acid or a mixture of a major amount of the same and a minor amount of methacrylate.

Suitable crosslinking agents include, but not by way of limitation, 1,3-butylene diacrylate, 1,3-butylene dimethacrylate, divinyl benzene, 1,6-hexamethylene diacrylate, 1,6-hexamethylene dimethacrylate, 1,1,1-trimethylolethane triacrylate, 1,1,1-trimethylolethane trimethacrylate, 1,1,1-trimethylolpropane triacrylate, 1,1,1-trimethylolpropane trimethacrylate, 1,4-dimethylolcyclohexane dimethacrylate, allyl acrylate, allyl methacrylate, methallyl acrylate, methallyl methacrylate, diallyl maleate, diallyl fumarate, and diallyl phthalate. In one embodiment, the crosslinking agent is a diester of acrylic or methacrylic acid and a $C_2$–$C_8$, preferably $C_2$–$C_6$, dihydric alcohol. In another embodiment, the crosslinking agent is a triester of acrylic or methacrylic acid and a $C_2$–$C_8$, preferably $C_2$–$C_6$, trihydric alcohol.

In the first reaction stage, there is preferably employed about 80 to about 98 mole percent of a monofunctional, monoacrylate and about 20 to about 2 mole percent of the cross-linking agent.

In the second stage reaction, it is preferred to use a mixture of about 65 to about 99, preferably about 70 to about 95 percent methyl methacrylate and about 1 to about 35, preferably about 5 to about 30, mole percent of hydroxyalkyl acrylate. These are added before the first reaction ceases. The amounts of the second stage reactants relative to the combined first stage reactants may vary widely depending upon the physical properties desired in the final product, i.e., from about 10 to about 90 to about 90 to about 10 weight percent.

The methyl methacrylate concentration in the outer shell is advisedly at least about 30 mole percent with the balance of the monofunctional component being made up of monofunctional monoacrylates, e.g., esters of $C_2$–$C_8$ monohydric alcohols and either acrylic or methacrylic acid, or monofunctional vinyl hydrocarbons such as styrene, methyl substituted styrenes, e.g. alpha methyl styrene, vinyl toluene, etc. It will also be advantageous at times to have a limited amount of crosslinking in the outer shell and hence to include in said "balance" a minor amount of a diacrylate, e.g., 1 to 30 mole percent of a diester of acrylic or methacrylic acid and a $C_2$–$C_8$, preferably $C_2$–$C_6$, dihydric alcohol, or divinyl hydrocarbon, e.g., 1 to 30 mole percent of divinyl benzene. The physical properties of the outer shell may also be modified by replacing up to about 30 mole percent of the methyl methacrylate with acrylonitrile or methacrylonitrile.

The initial monomer charge is usually emulsified by one or more micelle-forming compounds composed of a hydrophobic part, such as a hydrocarbon group containing 8 or more carbon atoms, and a hydrophilic part, such as alkaline metal or ammonium carboxylate groups, phosphate or sulfate partial ester groups, sulfonate groups, and the like period. Exemplary emulsifying agents include alkali metal sulfonates of styrene, naphthalene, decyl benzene and dodecyl benzene; sodium dodecyl sulfate, sodium stearate; sodium oleate; sodium alkyl aryl sulfonates; polyoxyethylene sulfates and phosphates; the polyoxyethylene oxide condensate with long chain fatty acids, alcohols, and mercaptans and the alkali metal salts of rosin acids. These materials and techniques of employment of emulsion formation and maintenance are well known to the art and have no unusual application here. As they are conventional materials employed in a conventional manner further description is unnecessary.

The polymerization initiator is composed of one or more water-soluble, free-radical-generating species such as hydrogen peroxide or sodium, potassium, or ammonium persulfates, perborates, peracetates, percarbonates and the like. As is well known in the art, these initiators may be associated with activating systems such as redox systems which may incorporate mild reducing agents such as sulfites and thiosulfites and redox reaction promotors such as transition metal ions.

A chain transfer agent or a mixture of chain transfer agents may be added to the reaction medium to limit the molecular weight of the polymer. Such transfer agents are generally mercaptans such as dodecane thiol, pentane thiol, and butane thiol.

Those skilled in the art will be aware that other emulsifying agents, polymerization initiators and chain transfer agents may be used when compatible with the polymerization system herein employed.

The reaction may be carried out at temperatures from about 40° C. to about 80° C., or at lower temperatures, as from 0° C. to 80° C. in the case of activated systems.

The graded rubber particles above described and this method of preparation are disclosed by Ray A. Dickie and Seymour Newman in their patent application Ser. No. 100,390 filed of even date with this application.

In another method of preparation, hereinafter illustrated, the rubber particles are formed in an aliphatic hydrocarbon medium.

(II) Preparation of the monoblocked diisocyanate

The diisocyanates employed herein are monoblocked to allow for separate stage reactions and thereby avoid crosslinking until the shape of the desired molding has been established.

Suitable diisocyanates for this purpose include, but not by way of limitation, toluene diisocyanate, 4,4'-diphenylmethane diisocyanate, 1-phenoxy-2,4-phenylene diisocyanate, 1-tert-butyl-2,4-phenylene diisocyanate, and 1-ethyl-2,4-phenylene diisocyanate.

The preferred blocking agent is caprolactam. Other blocking agents such as phenols and tertiary butyl alcohol may also be used. The blocking agents are selected so that the blocked isocyanate group is converted to free isocyanate group in a temperature range of about 120° to about 170° C. Sometimes a catalyst such as triethylene diamine or stannous octoate may be advantageously used in 0.05 to 1 percent concentration (basis weight of reactants) to assist the deblocking process.

A diisocyanate can be monoblocked with caprolactam by intimately dispersing the two in toluene, preferably at a slightly elevated temperature. When the first isocyanate group is blocked, the monoblocked product precipitates out of solution. See Raymond R. Myers and J. S. Long, Film-Forming Compositions, vol. 1, Part I, page 485, published by Marcel Dekker Inc., New York, U.S.A. (1961).

(III) Preparation of the moldable reaction product

The unblocked isocyanate group of the monoblocked diisocyanate is reacted with a hydroxyl group on the surface of a particle of the hydroxy-functional, graded, elastomer in an organic solvent. The solvent preferably contains a suitable catalyst and is mildly heated to facilitate reaction. The organic solvent is recovered as a dry foam. This foam is powdered and further dried. It is then ready for molding.

(IV) Preparation of the molded product

The product formed by reacting the unblocked isocyanate group of the monoblocked diisocyanate with the hydroxy-functional, graded, elastomeric particles can be molded and crosslinked by conventional molding techniques. The temperature of the molding powder is raised to a temperature which will result in the unblocking of the other isocyanate group. The thermoset then crosslinks when this group reacts with a hydroxy group on the surface of the rubber-like particles.

This powder may comprise the sole component of the molding powder or it may be admixed with other hydroxy-functional powder, e.g. the hydroxy-functional, graded, elastomeric particles which have not been pre-reacted with diisocyanate.

This invention will be more fully understood from the following illustrative examples:

EXAMPLE 1

To 1,000 parts by weight water which has been boiled and cooled to room temperature under a nitrogen atmosphere are added 2.86 parts by weight sodium dodecyl sulfate dissolved in 35.7 parts by weight water and about ⅑ of a monomer mixture consisting of 521 parts butyl acrylate and 48.5 parts by weight 1,3-butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about ten minutes, addition of the remainder of the first monomer mixture is begun at a rate such that the temperature of the reaction mixture is maintained at 47° to 50° C. During the addition of the last two-thirds of the first monomer mixture, 5.72 parts by weight sodium dodecyl sulfate dissolved in 35.7 parts by weight water are added at a substantially constant rate. The reaction mixture is maintained at 47° to 50° C. for about 60 minutes prior to beginning simultaneous dropwise addition of a mixture of 1180 parts by weight methyl methacrylate and 425 parts by weight hydroxyethyl methacrylate, 30 parts by weight dodecyl mercaptan, and 2.86 parts by weight sodium dodecyl sulfate dissolved in 35.7 parts by weight water. This addition, which requires about 30 minutes, is carried out at such a rate that the temperature of the reaction mixture is at 47° to 50° C. Following this addition, the mixture is maintained at 47° to 49° C. for an additional 2 hours.

The emulsion is then coagulated by addition of 20 grams of concentrated hydrochloric acid solution in 100 ml. of water. The rubber particles are isolated by filtration and washed with methanol containing 1 weight percent of hydrochloric acid. The particles are then dried.

One hundred parts by weight of the above particles are dispersed in 800 parts by weight of acetone and to it are added 27 parts by weight of monocaprolactam blocked diphenyl methane diisocyanate of the following structure:

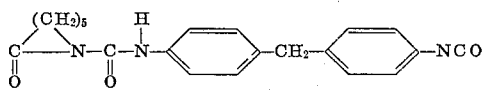

Stannous octoate in the amount of 0.2 part by weight and 0.4 part by weight triethylenediamine are added and the mixture is heated at 60° C. for 4 hours. The acetone is removed under vacuum to obtain a dry foam. The foam is then powdered and further dried under vacuum for 4 hours at 70° C.

The powder thus obtained is compression molded at 175° C. for 10 minutes. A yellowish colored sheet is obtained which is tough and insoluble in acetone.

The monocaprolactam blocked diphenylmethane diisocyanate is prepared by the following procedures: 300 parts by weight of 4,4'-diphenylmethane diisocyanate and 113 parts by weight caprolactam are added to 1600 parts by weight toluene and the mixture is maintained at 80° C. for 8 hours. After cooling to room temperature, the precipitate obtained is filtered and dried under vacuum.

EXAMPLE 2

About 1000 parts by weight water is boiled for 10 minutes and then cooled to room temperature under nitrogen. Sodium dodecyl sulfate in the amount of 2.9 parts by weight dissolved in 36 parts by weight water is added. To this solution is added 1/10 of a mixture of 500 parts by weight ethyl acrylate and 50 parts by weight triethylene glycol dimethacrylate. The mixture is stirred to establish an emulsion.

To this emulsion is then added 3.2 parts by weight potassium persulfate dissolved in 71 parts by weight and the mixture is heated to 45° C. Temperature begins to rise in about 10 minutes. The temperature is maintained between 47° and 50° C. by simultaneous cooling during slow addition of the remaining 9/10 of the monomer mixture. During the last 2/3 of the addition of this fraction of the monomer mixture there is added at a constant rate 6 parts by weight of sodium dodecyl sulfate dissolved in 36 parts by weight water. The reaction mixture is maintained at 47° to 52° C. for one hour after the monomer addition is complete.

There is then added a second mixture of monomers consisting of 1200 parts by weight methyl methacrylate, 400 parts by weight hydroxyethyl methacrylate, and 10 parts by weight pentane thiol. This mixture is added slowly. The reaction temperature is maintained at 47°–50° C. during the addition and 2 hours afterwards.

The emulsion obtained above is coagulated by adding 20 grams of concentrated hydrochloric acid in 200 ml. of water. The cake obtained is filtered and washed with methanol containing 1 weight percent of hydrochloric acid. The cake is then washed twice with anhydrous ethanol and dried under vacuum. This is designated as material A.

Determination of the concentration of reactive hydroxyl groups on the surfaces of the particles is made by the well known method of analysis wherein the hydroxyl groups are reacted with acetic anhydride using a pyridine catalyst. The acetic acid is back titrated with sodium hydroxide. For details reference is made to C. A. Steyermark, Quantitative Organic Analysis, pp. 302–303 published by Blakiston Company, New York, Toronto, and Philadelphia (1951).

In 800 parts by weight of methyl ethyl ketone are dispersed 100 parts by weight of A and 30 parts by weight of monocaprolactam blocked diphenylmethane diisocyanate. To this dispersion is added 0.4 part by weight triethylene diamine and 0.2 part by weight stannous octoate and the mixture is heated at 70° C. for 4 hours.

The solvent is removed under vacuum to obtain a powder containing less than 2 percent solvent. This powder is hereinafter referred to as material B. This powder is compression molded at 170° C. for 15 minutes to obtain a urethane-crosslinked, rubber-comprising thermoset sheet.

EXAMPLE 3

One hundred (100) parts by weight of material A is reacted with 60 parts by weight of caprolactam monoblocked diphenyl methane diisocyanate in methyl ethyl ketone. After removing the solvent under vacuum, the powder, material C, is mixed with 10 parts by weight of ethylene glycol and compression molded at 175° C. for 15 minutes.

EXAMPLE 4

One hundred (100) parts by weight of material A is mixed with 60 parts by weight of caprolactam monoblocked diphenyl methane diisocyanate and 10 grams of ethylene glycol and extruded through a mixing extruder at 135° C. The extrudate is chopped to pellets which on compression molding at 375° F. yield a slightly yellowish colored crosslinked sheet resistant to organic solvents.

EXAMPLE 5

The procedure of Example 2 is repeated except that material A is prepared from the following constituent monomers:

(A) First monomer mixture: Parts by weight
   (1) Butyl acrylate _____ 520
   (2) 1,3-butylene dimethacrylate _____ 80
(B) Second monomer mixture:
   (1) 2-hydroxypropyl methacrylate _____ 400
   (2) Methyl methacrylate _____ 1200 and 100 parts by weight of this material is reacted with 30 parts by weight of caprolactam monoblocked diphenyl methane diisocyanate.

EXAMPLE 6

The procedure of Example 2 is repeated except that material A is prepared from the following constituent monomers:

(A) First monomer mixture: Parts by weight
   (1) 2-ethyl hexyl acrylate _____ 520
   (2) Triethylene glycol dimethacrylate _____ 100
(B) Second monomer mixture:
   (1) 2-hydroxyethyl acrylate _____ 400
   (2) Methyl methacrylate _____ 1200 and 100 parts of above are reacted with 30 parts by weight of caprolactam monoblocked diphenyl methane diisocyanate.

EXAMPLE 7

The procedures of Examples 1 and 3 are repeated with the difference that the monoblocked diisocyanate is monoblocked toluene diisocyanate.

EXAMPLE 8

The procedures of Examples 1 and 3 are repeated with the difference that the monoblocked diisocyanate is monoblocked 1-phenoxy-2,4-phenylene diisocyanate.

EXAMPLE 9

The procedures of Examples 1 and 3 are repeated with the difference that the monoblocked diisocyanate is monoblocked 1-tert-butyl-2,4-phenylene diisocyanate.

EXAMPLE 10

The procedures of Examples 1 and 3 are repeated with the difference that the monoblocked diisocyanate is monoblocked 1-ethyl-2,4-phenyl diisocyanate.

EXAMPLE 11

The procedure of Example 1 is repeated with the difference that an equimolar amount of ethyl acrylate is substituted for the butyl acrylate used in the first monomer mixture to form the core of the graded rubber particle and one-half of the methyl methacrylate of the second monomer mixture used to form the outer shell is replaced with an equimolar amount of styrene.

EXAMPLE 12

The procedure of Example 1 is repeated with the difference that an equimolar amount of 2-ethyl hexyl acrylate is substituted for the butyl acrylate used in the first monomer mixture to form the core of the graded rubber particle and the second monomer mixture used to form the shell of the graded rubber particle is a mixture of about 40 mole percent methyl methacrylate, 15 mole percent ethyl acrylate, 10 mole percent butyl methacrylate, 10 mole percent acrylonitrile and 25 mole percent hydroxyethyl acrylate. The second monomer mixture is divided into 3 equal portions and the hydroxyethyl acrylate is added in the last of these portions.

EXAMPLE 13

The procedure of Example 1 is repeated with the difference that an equimolar amount of cyclohexyl acrylate is substituted for the butyl acrylate and an equimolar amount of 1,3-butylene diacrylate is substituted for the 1,3-butylene dimethacrylate used in the first monomer mixture to form the core of the graded rubber particle, and the second monomer mixture used to form the shell of said graded rubber particle is a mixture of 30 mole percent methyl methacrylate, 10 mole percent styrene, 15 mole percent methacrylonitrile, 10 mole percent 1,3-butylene dimethacrylate, 5 mole percent vinyl acetate and 30 mole percent hydroxypropyl methacrylate. The second monomer mixture is divided into 3 equal portions and the hydroxypropyl methacrylate is added to the reaction mixture with the last of these portions.

EXAMPLE 14

The procedure of Example 1 is repeated with the difference that an equimolar of 1,6-hexamethylene diacrylate is substituted for the 1,3-butylene dimethacrylate used in the first monomer mixture to form the core of the graded rubber particle.

EXAMPLE 15

The procedure of Example 1 is repeated with the difference that an equimolar amount of divinyl benzene is substituted for the 1,3-butylene dimethacrylate used in the first monomer mixture to form the core of the graded rubber particle, and the second monomer mixture used to form the shell of said particle is a mixture of 50 mole percent methyl methacrylate, 10 mole percent acrylonitrile, 10 mole percent divinyl benzene, and 30 mole percent hydroxypropyl acrylate. The second monomer mixture is divided into 3 equal portions and the hydroxypropyl acrylate is added to the reaction mixture in the last of these portions.

EXAMPLE 16

The procedure of Example 1 is repeated with the difference that a functionally equivalent amount of 1,1,1-trimethylolpropane trimethacrylate is substituted for the 1,3-butylene dimethacrylate in the formation of the core of the hydroxy-functional rubber particle.

EXAMPLE 17

The procedure of Example 1 is repeated with the difference that a functionally equivalent amount of 1,1,1-trimethylolethane triacrylate is substituted for the 1,3-butylene dimethacrylate in the formation of the core of the hydroxy-functional rubber particle.

EXAMPLE 18

The procedure of Example 1 is repeated with the difference that a functionally equivalent amount of 1,4-dimethylolcyclohexane dimethacrylate is substituted for the 1,3-butylene dimethacrylate in the formation of the core of the hydroxy-functional rubber particle.

EXAMPLE 19

The procedure of Example 1 is repeated with the difference that the hydroxy-functional graded rubber particles, i.e., the elastomeric particles having a core of crosslinked acrylic polymer and a hydroxy-functional, methyl methacrylate-comprising outer shell, are prepared in an organic solvent using the following procedure:

(A) a mixture is formed from the following:

| Materials: | Grams |
|---|---|
| Ethyl acrylate | 600.0 |
| 1,3-butylene dimethacrylate | 120.0 |
| Dispersion agent [1] | 3.0 |
| AIBN [2] | 5.0 |

[1] Amphipathic copolymer (one portion soluble in the acrylic monomers and the other portion soluble in the solvent, e.g., dodecane) is prepared by reacting 12-hydroxystearic acid (300 g.) in the presence of stearyl alcohol (310 g.) and p-toluene sulfonic acid (6 g.) at 180°–190° C. until the acid value is less than 1 mg.-KOH/g. The product is then reacted with methacrylic anhydride (170 g.). The resulting material is then copolymerized with an equimolar amount of methyl methacrylate using AIBN initiator (9 g.) and butyl acetate solvent. This method of producing this dispersing agent is described in detail by K. E. J. Barratt and H. R. Thomas in Journal of Polymer Science, Part A-1, vol. 7, 2625 (1969). Other dispersing agents which are effective for stabilizing suspensions in hydrocarbon liquids may be used in place of the above described materials.

[2] 2,2'-azobis-(2-methylproprionitrile).

(B) The mixture of the above listed materials is added to 4,000 grams n-dodecane under nitrogen. The reaction mixture is warmed to 40° C. When the exotherm starts the temperature is allowed to rise to 80° C. The temperature is maintained at 80- C. for 30 minutes.

(C) The reaction mixture is maintained in a nitrogen atmosphere and there is added slowly with stirring a mixture is maintained at 80° C. for 30 minutes.

| Materials: | Grams |
|---|---|
| Methyl methacrylate | 320.0 |
| Hydroxyethyl methacrylate | 80.0 |
| Dispersing agent [1] | 3.0 |
| AIBN | 6.0 |
| n-dodecane | 1000.0 |

[1] Amphipathic copolymer (one portion soluble in the acrylic monomers and the other portion soluble in the solvent, e.g., dodecane) is prepared by reacting 12-hydroxystearic acid (300 g) in the presence of stearyl alcohol (310 g.) and p-toluene sulfonic acid (6 g.) at 180°–190° C. until the acid value is less than 1 mg.-KOH/g. The product is then reacted with methacrylic anhydride (170 g.). The resulting material is then copolymerized with an equimolar amount of methyl methacrylate using AIBN initiator (9 g.) and butyl acetate solvent. This method of producing this dispersing agent is described in detail by K. E. J. Baratt and H. R. Thomas in Journal of Polymer Science, Part A-1, vol. 7, 2625 (1969). Other dispersing agents which are effective for stabilizing suspensions in hydrocarbon liquids may be used in place of the above described materials.

EXAMPLE 20

The procedures of Examples 1 and 19 are repeated with the difference that the concentration of hydroxyalkyl acrylate in the outer shell of the graded rubber particles is about 2 mole percent.

EXAMPLE 21

The procedures of Examples 1 and 19 are repeated with the difference that the concentration of hydroxyalkyl acrylate in the outer shell of the graded rubber particles is about 5 mole percent.

EXAMPLE 22

The procedures of Examples 1 and 19 are repeated with the difference that the concentration of hydroxyalkyl acrylate in the outer shell of the graded rubber particles is about 30 mole percent.

EXAMPLE 23

The procedure of Examples 1 and 19 are repeated with the difference that the concentration of hydroxyalkyl acrylate in the outer shell of the graded rubber particles is about 35 mole percent.

The terms "acrylate" and "acrylates," when used herein without a modifier distinguishing between esters of acrylic and methacrylic acid, shall be understood to include both. This, of course, does not apply to the naming of a specific compound.

The foregoing examples are illustrative of the invention defined in the appended claims. Those skilled in the art will be aware that modifications may be made therein without departing from the scope of the invention as set forth in the appended claims.

What is claimed is:

1. A molding powder formed by reacting a first and unblocked isocyanate group of a monoblocked organic diisocyanate with a hydroxy-functional particle of graded rubber consisting essentially of
   (1) a core of crosslinked acrylic polymer consisting essentially of
      (a) about 80 to about 98 mole percent of an alkyl ester of acrylic acid, and
      (b) about 2 to about 20 mole percent of divinyl benzene, a diester of acrylic or methacrylic acid and a $C_2$–$C_8$ dihydric alcohol or a triester of acrylic or methacrylic acid and a $C_2$–$C_8$ trihydric alcohol,
   (2) an outer shell having a glass transition temperature above that of said core and consisting essentially of the polymerization product of monomer mixtures selected from the group consisting of
      (a) about 65 to about 98 mole percent methyl methacrylate and about 2 to about 35 mole percent of a hydroxy-functional acrylate, and
      (b) about 2 to about 35 mole percent of a hydroxy-functional acrylate and about 65 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and a $C_2$–$C_6$ dihydric alcohol, and 0 to 30 mole percent of a monomer selected from acrylonitrile, methacrylonitrile and vinyl acetate, the second and blocked isocyanate group of this diisocyanate being rendered inactive by a blocking agent that releases from said diisocyanate at a temperature in the range of 120° to about 170° C. leaving said second isocyanate group free to react as an isocyanate group when said molding powder is molded at temperatures above about 120° C.

2. A molding powder in accordance with claim 1 wherein said hydroxy-functional particle of graded rubber consists essentially of said core, said outer shell and an intermediate layer which is a copolymer of the monomers used to form the outer shell.

3. A molding powder formed by reacting a first and unblocked isocyanate group of a monoblocked organic diisocyanate with a hydroxy-functional particle of graded rubber consisting essentially of
   (1) a core of crosslinked acrylic polymer consisting essentially of
      (a) about 80 to about 98 mole percent of an ester of acrylic acid and a $C_2$–$C_8$ monohydric alcohol, and
      (b) about 2 to about 20 mole percent of divinyl benzene, a diester of acrylic or methacrylic acid and a $C_2$–$C_8$ dihydric alcohol or a triester of acrylic or methacrylic acid and a $C_2$–$C_8$ dihydric alcohol or a triester of acrylic or methacrylic acid and a $C_2$–$C_8$ trihydric alcohol,
   (2) an outer shell having a glass transition temperature at least 50° C. above that of said core and consisting essentially of the polymerization product of monomer mixtures selected from the group consisting of
      (a) about 65 to about 98 mole percent methyl methacrylate and about 2 to about 35 mole percent of a hydroxy-functional acrylate selected from hydroxyethyl acrylate, hydroxyethyl methacrylate, hydroxypropyl acrylate and hydroxypropyl methacrylate, and
      (b) about 2 to about 35 mole percent of a hydroxy-functional acrylate selected from hydroxyethyl acrylate, hydroxyethyl methacrylate, hydroxypropyl acrylate and hydroxypropyl methacrylate and about 65 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and a $C_2$–$C_6$ dihydric alcohol, and 0 to 30 mole percent of a monomer selected from acrylonitrile, methacrylonitrile and vinyl acetate, the second and blocked isocyanate group of said diisocyanate being rendered inactive by a blocking agent that releases from said diisocyanate at a temperature in the range of about 120° to about 170° C. leaving said second isocyanate group free to react as an isocyanate group when said molding powder is molded at temperatures above about 120° C.

4. A molding powder in accordance with claim 3 wherein said hydroxy-functional particle of graded rubber has an average diameter in the range of about 0.04 to about 1 micron.

5. A molding powder in accordance with claim 3 wherein said core is crosslinked acrylic polymer consisting essentially of butyl acrylate and 1,3-butylene dimethacrylate.

6. A molding powder in accordance with claim 3 wherein said core is a crosslinked acrylic polymer consisting essentially of 2-ethyl hexyl acrylate and 1,3-butylene dimethacrylate.

7. A molding powder in accordance with claim 3 wherein said organic diisocyanate is toluene diisocyante.

8. A molding powder in accordance with claim 3 wherein said organic diisocyanate is 4,4'-diphenylmethane diisocyanate.

9. A molding powder in accordance with claim 3 wherein said organic diisocyanate is 1-phenoxy-2,4-phenylene diisocyanate.

10. A molding powder in accordance with claim 3 wherein said organic diisocyanate is 1-tert-butyl-2,4-phenylene diisocyanate.

11. A molding powder in accordance with claim 3 wherein said organic diisocyanate is 1-ethyl-2,4-phenylene diisocyanate.

12. A molding powder in accordance with claim 3 wherein said blocking agent is caprolactam.

13. A molding powder in accordance with claim 3 wherein said core is formed from about 80 to about 98 mole percent of an ester of acrylic acid and a $C_2$–$C_8$ monohydric alcohol and about 2 to about 20 mole percent of an triester of acrylic or methacrylic acid and a $C_2$–$C_8$ trihydric alcohol.

14. A molding powder in accordance with claim 3 wherein said core is formed from about 80 to about 98 mole percent of an ester of acrylic acid and a $C_2$–$C_8$ monohydric alcohol and about 2 to about 20 mole percent of a triester of acrylic or methacrylic acid and about 2 to about 20 mole percent of divinyl benzene.

15. A molding powder in accordance with claim 3 wherein said hydroxy-functional particle of graded rubber consists essentially of said core, said outer shell and an intermediate layer which is a copolymer of the monomers used to form said core and the monomers used to form the outer shell.

16. A molded thermoset product formed by (A) reacting a first and unblocked isocyanate group of a monoblocked organic diisocyanate with a hydroxy-functional particle of graded rubber consisting essentially of
   (1) a core of crosslinked acrylic polymer consisting essentially of
      (a) about 80 to about 98 mole percent of an alkyl ester of acrylic acid, and
      (b) about 2 to about 20 mole percent of divinyl benzene, a diester of acrylic or methacrylic acid and a $C_2$–$C_8$ dihydric alcohol or a triester of acrylic or methacrylic acid and a $C_2$–$C_8$ trihydric alcohol,
   (2) an outer shell having a glass transition temperature above that of said core and consisting essentially of the polymerization product of monomer mixtures selected from the group consisting of
      (a) about 65 to about 98 mole percent methyl methacrylate and about 2 to about 35 mole percent of a hydroxy-functional acrylate, and
      (b) about 2 to about 35 mole percent of a hydroxy-functional acrylate and about 65 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and a $C_2$–$C_6$ dihydric alcohol, and 0 to 30 mole percent of a monomer selected from acrylonitrile, methacrylonitrile and vinyl acetate,
the second and blocked isocyanate group of this diisocyanate being rendered inactive by a blocking agent that releases from said diisocyanate at a temperature in the range of 120° to about 170° C. leaving said second isocyanate group free to react as an isocyanate group when said molding powder is molded at temperatures above about 120° C., and (B) crosslinking said powder by molding the same at a temperature above about 120° C.

17. A molded product in accordance with claim 16 wherein said hydroxy-functional particle of graded rubber has average diameter in the range of about 0.1 to about 0.2 micron.

18. A molded product in accordance with claim 16 wherein said core is crosslinked acrylic polymer consisting essentially of butyl acrylate and 1,3-butylene dimethacrylate.

19. A molded product in accordance with claim 16 wherein said core is a crosslinked acrylic polymer consisting essentially of 2-ethyl hexyl acrylate and 1,3-butylene dimethacrylate.

20. A molded product in accordance with claim 16 wherein said organic diisocyanate is toluene diisocyanate.

21. A molded product in accordance with claim 16 wherein said organic diisocyanate is 4,4'-diphenylmethane diisocyanate.

22. A molded product in accordance with claim 16 wherein said organic diisocyanate is 1-phenoxy-2,4-phenylene diisocyanate.

23. A molded product in accordance with claim 16 wherein said organic diisocyanate is 1-tert-butyl-2,4-phenylene diisocyanate.

24. A molded product in accordance with claim 16 wherein said blocking agent is caprolactam.

25. A molded product in accordance with claim 16 wherein said core is formed from about 80 to about 98 mole percent of an ester of acrylic acid and a $C_2$–$C_8$ monohydric alcohol and about 2 to about 20 mole percent of a triester of acrylic or methacrylic acid and a $C_2$–$C_8$ trihydric alcohol.

26. A molded product in accordance with claim 16 wherein said core is formed from about 80 to about 98 mole percent of an ester of acrylic acid and a $C_2$–$C_8$ monohydric alcohol and about 2 to about 20 mole percent of a triester of acrylic or methacrylic acid and about 2 to about 20 mole percent of divinyl benzene.

27. A molding powder in accordance with claim 16 wherein said hydroxy-functional particle of graded rubber consists essentially of said core, said outer shell and an intermediate layer which is a copolymer of the monomers used to form said core and the monomers used to form the outer shell.

28. A molding powder formed by reacting a first and unblocked isocyanate group of a monoblocked organic diisocyanate with a hydroxy-functional particle of graded rubber consisting essentially of
   (1) a core of crosslinked acrylic polymer consisting essentially of
      (a) a major amount of a monofunctional, monoacrylate, and
      (b) a minor and crosslinking amount of a di- or tri-functional monomer containing 2 or more non-conjugated terminal ethylenic groups,
   (2) an outer shell consisting essentially of the polymerization product of monomers selected from the group consisting of
      (a) methyl methacrylate, and
      (b) a mixture of methyl methacrylate and a remainder selected from monofunctional monoacrylates, difunctional monoacrylates, monovinyl hydrocarbons, divinyl hydrocarbons, acrylonitrile, methacrylonitrile, acrylic acid and methacrylic acid, said methyl methacrylate comprising at least 30 mole percent of said mixture,
the second and blocked isocyanate group of this diisocyanate being rendered inactive by a blocking agent that releases from said diisocyanate at a temperature in the range of 120° to about 170° C. leaving said second isocyanate group free to react as an isocyanate group when said molding powder is molded at temperatures above about 120° C.

29. A molded thermoset product formed by (A) reacting a first and unblocked isocyanate group of a monoblocked organic diisocyanate with a hydroxy-functional particle of graded rubber consisting essentially of
   (1) a core of crosslinked acrylic polymer consisting essentially of
      (a) a major amount of a monofunctional, monoacrylate, and
      (b) a minor and crosslinking amount of a di- or tri-functional monomer containing 2 or more non-conjugated terminal ethylenic groups,
   (2) an outer shell consisting essentially of the polymerization product of monomers selected from the group consisting of
      (a) methyl methacrylate, and
      (b) a mixture of methyl methacrylate and a remainder selected from monofunctional monoacrylates, difunctional monoacrylates, monovinyl hydrocarbons, divinyl hydrocarbons, acrylonitrile, methacrylonitrile, acrylic acid and methacrylic acid, said methyl methacrylate comprising at least 30 mole percent of said mixture, the second and blocked isocyanate group of this diisocyanate being rendered inactive by a blocking agent that releases from said diisocyanate at a temperature in the range of 120° to about 170° C. leaving said second isocyanate group free to react as an isocyanate group when said molding powder is molded at temperatures above about 120° C., and (B) crosslinking said powder by molding the same at a temperature above about 120° C.

References Cited

UNITED STATES PATENTS

| | | | |
|---|---|---|---|
| 3,423,481 | 1/1969 | Mizutani | 260—836 |
| 3,437,514 | 4/1969 | Burlant | 117—93.31 |
| 3,450,796 | 6/1969 | Griffin | 260—885 |
| 3,502,745 | 3/1970 | Minton | 260—881 |
| 3,509,234 | 4/1970 | Burlant | 260—859 |
| 3,528,844 | 9/1970 | Burlant | 260—885 |

PAUL LIEBERMAN, Primary Examiner

U.S. Cl. X.R.

260—77.5 CR, 77.5 TB, 885